(12) United States Patent
Lajevardi et al.

(10) Patent No.: US 11,809,060 B2
(45) Date of Patent: Nov. 7, 2023

(54) SEGMENTED DIGITAL TO OPTICAL PHASE-SHIFT CONVERTER

(71) Applicant: Robert Bosch GmbH, Stuttgart (DE)

(72) Inventors: Pedram Lajevardi, Menlo Park, CA (US); Behnam Behroozpour, S. San Francisco, CA (US); Christoph Lang, Sunnyvale, CA (US); Ken Wojciechowski, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 16/964,782

(22) PCT Filed: Jan. 24, 2019

(86) PCT No.: PCT/EP2019/051768
§ 371 (c)(1),
(2) Date: Jul. 24, 2020

(87) PCT Pub. No.: WO2019/149617
PCT Pub. Date: Aug. 8, 2019

(65) Prior Publication Data
US 2021/0055625 A1    Feb. 25, 2021

Related U.S. Application Data

(60) Provisional application No. 62/624,210, filed on Jan. 31, 2018, provisional application No. 62/624,213, filed on Jan. 31, 2018.

(51) Int. Cl.
*G02F 1/295*     (2006.01)
*G02F 1/025*     (2006.01)

(52) U.S. Cl.
CPC ............ *G02F 1/2955* (2013.01); *G02F 1/025* (2013.01)

(58) Field of Classification Search
CPC .............................. G02F 1/2955; G02F 1/025
(Continued)

(56) References Cited

U.S. PATENT DOCUMENTS 5,237,629 A * 8/1993 Hietala ................. H01Q 3/36
                                                         385/24
7,360,705 B2 * 4/2008 Heinrich ............ G06K 7/10574
                                                         235/462.43
(Continued)

OTHER PUBLICATIONS

International Search Report corresponding to International Patent Application No. PCT/EP2019/051768, dated Apr. 1, 2019 (4 pages).
(Continued)

*Primary Examiner* — Robert Tavlykaev
(74) *Attorney, Agent, or Firm* — Maginot, Moore & Beck LLP (57) ABSTRACT

A phase-shifter for a light-transmitting waveguide is segmented into multiple segments that can be calibrated to the overall length of a conventional single phase-shifter. Each segment receives a control signal, which can be a single bit signal, with the phase-shift capability of the segmented phase-shifter controlled by which segment(s) receive(s) a control signal. In one implementation, a binary weighting is applied to determine segment lengths. Smaller segments can be increased in length to achieve a $2\pi$ offset of the phase shift produced by the segment while maintaining the same binary relationship among segments. In another embodiment, multiple segments of uniform lengths can be used for a single phase-shifter with each segment controlled by an n-bit signal.

17 Claims, 4 Drawing Sheets

(58) Field of Classification Search
USPC .................................................. 385/1–3
See application file for complete search history.

(56) References Cited

U.S. PATENT DOCUMENTS

| | | | |
|---|---|---|---|
| 7,961,373 B2* | 6/2011 | Spahlinger | G02F 1/0316 |
| | | | 359/254 |
| 9,329,412 B2* | 5/2016 | Voigt | G02F 1/0316 |
| 9,977,310 B2* | 5/2018 | Winzer | G02F 7/00 |
| 10,620,375 B2* | 4/2020 | Ehrlichman | H04B 10/516 |
| 10,684,527 B2* | 6/2020 | Watts | G02F 1/225 |
| 2002/0172463 A1 | 11/2002 | Romanovsky | |
| 2006/0147146 A1 | 7/2006 | Voigt et al. | |
| 2006/0209306 A1* | 9/2006 | Spahlinger | G02F 1/0316 |
| | | | 356/464 |
| 2007/0212076 A1* | 9/2007 | Roberts | H04B 10/5053 |
| | | | 398/183 |
| 2011/0044573 A1* | 2/2011 | Webster | H04B 10/5053 |
| | | | 385/3 |
| 2011/0149369 A1 | 6/2011 | Tu et al. | |
| 2012/0251032 A1* | 10/2012 | Kato | G02F 1/0327 |
| | | | 385/3 |
| 2015/0277158 A1* | 10/2015 | Akiyama | H04B 10/5051 |
| | | | 385/3 |
| 2018/0107091 A1* | 4/2018 | Hosseini | G02F 1/292 |

OTHER PUBLICATIONS

Ehrlichman, Y. et al., "Direct-Digital-Drive Microring Modulator," arXiv.org, Cornell University Library, arXiv:1603.03802v1, Mar. 11, 2016 (4 pages).

Doylend, J. K. et al., "Hybrid III-V Silicon Photonic Steerable Laser," IEEE Photonics Conference (IPC), Sep. 23, 2012 (2 pages).

Chung, S. et al., "A Monolithically Integrated Large-Scale Optical Phased Array in Silicon-on-Insulator CMOS," IEEE Journal of Solid-State Circuits, vol. 53, No. 1, Jan. 2018 (22 pages).

* cited by examiner

SEGMENTED DIGITAL TO OPTICAL PHASE-SHIFT CONVERTER

CROSS-REFERENCE TO RELATED APPLICATIONS

This application is a 35 U.S.C. § 371 National Stage Application of PCT/EP2019/051768, filed on Jan. 24, 2019, which claims priority to U.S. Provisional Application Ser. Nos. 62/624,210 and 62/624,213, both of which were filed on Jan. 31, 2018, the disclosures of all of which are incorporated herein by reference in their entirety.

BACKGROUND

Optical phased-arrays (OPAs) have a wide range of applications in photonic and optical systems. Exemplary applications of OPAs include free-space communication, LIDAR, and optical tweezers for cell trapping and control in biology labs. One function of an OPA is to form a beam from the light of a coherent source and to steer it. Another function of an OPA is to collect coherent light from the ambient light with angle selectivity so that only the light coming from a particular angle couples into the receiver and the light from the other angles is either attenuated or fully rejected. In a LIDAR, for example, OPAs can be used for either one of these two functions. On the transmit side, the OPA can form a beam from a coherent light source, such as a laser, and steer it on a scene to be imaged. On the receive side of the LIDAR, the OPA can be used to collect the light reflected back from the target into the receiver.

OPAs come in different forms, although integrated photonic OPAs are perhaps the more widely-used type because of their small footprint. Another benefit of photonic OPAs is that they do not have any moving parts (as opposed to MEMS OPAs) which inherently make them more reliable with a longer lifetime than other types of OPAs. A fundamental element in an integrated photonic OPA is the phase-shifter. Any OPA requires many phase-shifters to adjust the phase of the light emitting from each antenna element and consequently to rotate the wavefront to the desired direction.

Figure 1:
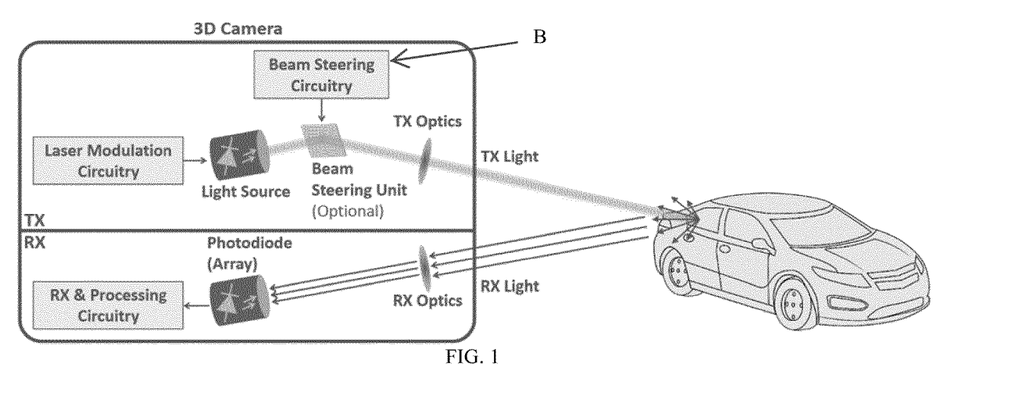
FIG. 1 is a diagram of a 3D camera for use as a Lidar system.
Figure 2:
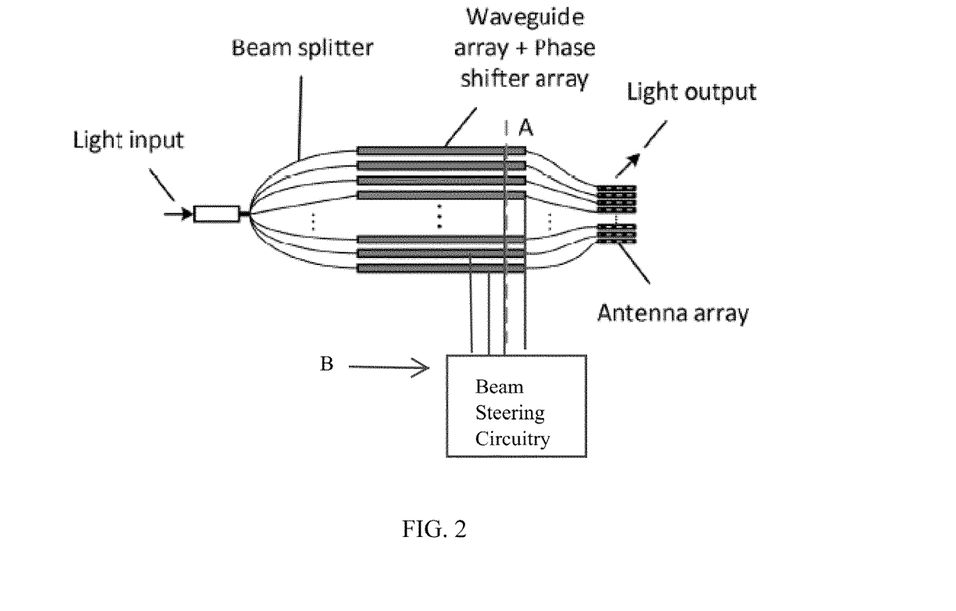
FIG. 2 is a diagram of components of a TX light transmission module of the 3D camera of FIG. 1.

Some OPAs are only used for beam forming and cannot steer the beam direction. In such OPAs, the phase-shift of the light emitting from each antenna element is physically implemented into the array (e.g. by having a waveguide with different physical length before each antenna element) and cannot be changed after fabrication. Some applications, however, require beam steering in addition to beam forming. An exemplary Lidar system is illustrated in FIGS. 1-2 in which a light beam TX, such as a laser beam, is transmitted by an antenna element, or multiple antenna elements, toward an object or scene. The reflected light RX is received by a photodetector, such as a photodiode array, and processed to generate image and time-of-flight information for further processing. The transmission of the TX light can be implemented by a TX module and the light detection in an RX module in a 3D camera. In the exemplary LIDAR of FIG. 1, the TX module includes a light source, such as a laser, controlled by circuitry, such as the laser modulation circuitry, with the beam provided to a waveguide array. The waveguide is formed of a material that can convey the laser light to an output end of each waveguide. The TX module further includes optics at the output end of the waveguide array that combines the light beam propagating through each waveguide into a combined light beam. The optics can be configured to generate a far-field beam useful in Lidar and 3D imaging applications.

In the typical Lidar system, beam steering is needed to scan the scene with the laser light. In such applications phase-shifting of the light beam emitted from each antenna element can change the angle of the wavefront. A diagram of the beam steering component B of the TX module is shown in FIG. 2. The input light passes through a beam splitter that directs the light to a plurality of waveguides in an array, which can be semi-conductor waveguides. The waveguide array incorporates a phase-shifter array that is controlled by the beam steering circuitry (FIG. 1) to adjust the amount of phase-shifting of the light passing through each waveguide and transmitted at the antenna array. This phase adjustment enables changing the angle of the wavefront dynamically and pointing the TX light to different parts of a scene. In such cases, an electronic way for controlling thousands of phase-shifter elements is vital to achieve the desired performance.

Many different material properties and structures can be used to implement a variable phase-shifter. One of the common structures for a simple phase-shifter is a piece of waveguide, for which the physical length or its refractive index can be changed to induce a variable phase delay on the light path. Thermo-optic phase-shifters use the change in the refractive index as a function of temperature to induce a controlled phase-shift on the light path. Electro-optic phase-shifters use the dependence of the refractive index on the carrier concentration in the medium to control the phase delay. Other types of phase-shifters, such as photoelastic, also exist that provide different mechanisms for changing the refractive index of the waveguide. Independent of the type of the phase-shifter used, one of the big challenges in implementing a large-scale OPA is to generate the proper control signal for these phase-shifters versus time. In certain cases, thousands of digital-to-analog converters (DACs), each with >10 bits operating at frequencies beyond 1 MHz, might be required to work in parallel.

SUMMARY OF THE DISCLOSURE

This disclosure contemplates a phase-shifter for a light-transmitting waveguide in which the phase-shifter is segmented into multiple segments that are calibrated to the overall length of the conventional single phase-shifter. The operation of the phase-shifter is controlled by a control signal, which can be a voltage received from a controller. Each segment receives a control signal, which can be a single bit signal, with the phase-shift capability of the segmented phase-shifter controlled by which segment(s) receive(s) a control signal. In one implementation, a binary weighting is applied to determine segment lengths. In another implementation, smaller segments can be increased in length to achieve a $2\pi$ offset while maintaining the same binary relationship among segments. In a further aspect of the disclosure, multiple segments of uniform lengths can be used for a single phase-shifter with each segment controlled by an n-bit signal.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains In order to reduce the complexity of the control electronics in the beam steering circuitry B, the present disclosure contemplates a phase-shifter that is segmented in its physical implementation, with multiple segments along the light path of the waveguide. A conventional phase-shifter may be in the form of a 2-bit controlled linear phase-shifter P having a length l, as shown in the example of FIG. 3(a). In a typical phase-shifter, the length l is 3.0 mm. The beam steering circuitry B provides a control signal or analog voltage $V_{CTRL}$ to electrical contacts on the phase-shifter P. In this particular example, the analog voltage $V_{CTRL}$ has 2-bit resolution so that the phase-shifter can produce four different phase shifts depending on the magnitude of $V_{CTRL}$.

In accordance with one aspect of the disclosure, the complexity of the beam steering circuitry B is reduced by providing a phase-shifter 12 within a waveguide 10 that is segmented into two cascaded segments 14, 16, as shown in FIG. 3(b). The combined length of the two segments is equal to the length l of the conventional phase-shifter P. In one specific embodiment, the upstream segment 14 has a length that is ⅔ the length l, or 2.0 mm in the specific example, and the downstream segment 16 has a length that is ⅓ the length l, or 1.0 mm in the example. Each segment is controlled by a single-bit signal $V_0$ that is either on (1) or off (0). The single-bit voltage signals $V_0$ to each phase-shifter segment are generated by the beam steering component B. In order to produce a zero phase-shift, both segments are kept off—i.e., $V_0$ is zero for each segment. Providing a non-zero voltage $V_0$ to only the downstream ⅓l segment 16 will introduce a phase shift of $\Delta\varphi$, while turning on only the longer upstream ⅔l segment 14 will introduce a phase-shift of twice the shorter segment or $2\Delta\varphi$. Providing a non-zero voltage $V_0$ to each segment 14, 16 of the phase-shifter 12 together will produce a combined phase-shift of $3\Delta\varphi$.

Therefore, by using only a single-bit (on or off) control signal to each phase-shifter segment 14, 16, a 4-level phase-shift equivalent to two-bit control can be generated. It can be appreciated that the maximum phase shift $3\Delta\varphi$ is equivalent to the maximum phase shift for the conventional single linear phase-shifter P depicted in FIG. 3(a). It can be further appreciated that providing segment 14 with a length ⅔l that is twice the length ⅓l of the trailing segment 16 achieves uniform phase shift changes of $\Delta\varphi$. In other words, applying a non-zero voltage $V_0$ to the two segments in a binary sequence produces phase shift increases of (N−1) $\Delta\varphi$ with each step, as reflected in the following chart:

| Step | Segment 14 | Segment 16 | Binary Equivalent | Phase shift |
| --- | --- | --- | --- | --- |
| 1 | Off | Off | 00 | 0 |
| 2 | Off | On | 01 | $\Delta\varphi$ |
| 3 | On | Off | 10 | $2\Delta\varphi$ |
| 4 | On | On | 11 | $3\Delta\varphi 0$ |

Figure 3:
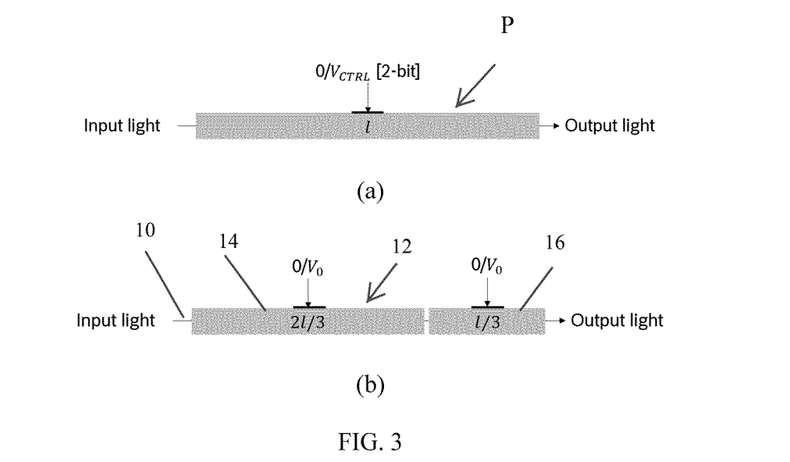
FIG. 3(a) is a diagram of a conventional phase-shifter with two-bit control.
FIG. 3(b) is a diagram of a phase-shifter segmented into individually controlled two segments according to one aspect of the disclosure.
Figure 4:
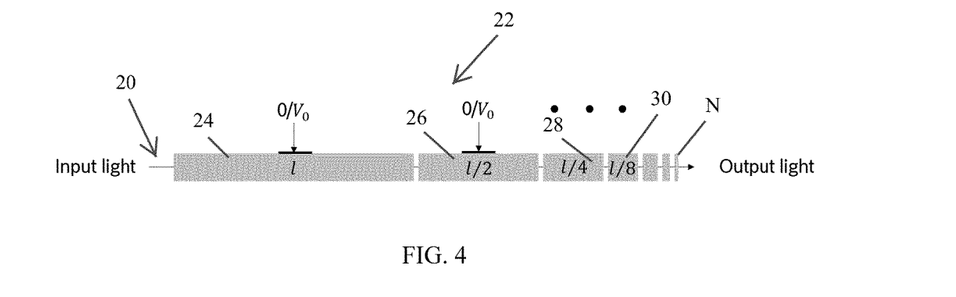
FIG. 4 is a diagram of a multi-segment, multi-bit phase-shifter according to a further aspect of the disclosure.

The multi-segment feature of the phase-shifters in FIG. 3(b) can be extended to multiple bits by increasing the number segments. With binary weighting of the segment lengths, an N-bit controlled phase-shifter can be implemented using an N-segment phase-shifter and only a single-bit (on/off) control signal for each segment as shown in FIG. 4. In the example shown in FIG. 4, a waveguide 20 includes a phase-shifter 22 formed by segments 24, 26, 28, 30, . . . N, with the segment lengths being binary weighted so that the next successive segment has a length that is half the length of the preceding segment. In the illustrated example, the segment 24 has a length l, the next segment 26 has a length of ½l, and the next segment 28 has a length that is half the previous segment or ¼l. The length of each segment in this example is given by the relationship $(½^{n-1})l$, where n is the segment number, and the total length of the phase-shifter 22 is given by the relationship $$\frac{\sum_{1}^{N} 2^{n-1}}{2^{n-1}},$$

where N is the total number of segments and n is the number of the current segment with n=1 identifying the longest segment. As with the embodiment of FIG. 3, the smallest segment, or segment N, can be defined as providing a phase shift of $\Delta\varphi$. With the binary relationship between segments, the next smallest segment, segment N−1, has a phase shift of $2\Delta\varphi$ because the next smallest segment is twice as long as the smallest segment. This relationship continues to the largest segment so that the phase shift of segment n=1 is $2^{N-1}\Delta\varphi$. The phase shift of any particular segment is thus $2^{N-n}\Delta\varphi$, where N is the total number of segments and n is the number of the particular segment. As with the phase-shifter 12, the total phase-shift provided by the phase-shifter 22 is determined by which of the segments 24, 26, etc. are activated with a voltage $V_0$. The total phase shift when all the segments are activated is $(2^N-1)\Delta\varphi$ Thus, for a four-segment embodiment, the maximum phase shift is $(2^4-1) \Delta\varphi$ or $15\Delta\varphi$, and binary activation of the segments of lengths l, ½l, ¼l and ⅛l produce phase-shifts according to the following Table 1:

| Step | Seg. 24 | Seg. 26 | Seg. 28 | Seg. 30 | Binary Equiv. | Phase shift |
|---|---|---|---|---|---|---|
| 1 | Off | Off | Off | Off | 0000 | 0 |
| 2 | Off | Off | Off | On | 0001 | $\Delta\varphi$ |
| 3 | Off | Off | On | Off | 0010 | $2\Delta\varphi$ |
| 4 | Off | Off | On | On | 0011 | $3\Delta\varphi$ |
| 5 | Off | On | Off | Off | 0100 | $4\Delta\varphi$ |
| 6 | Off | On | Off | On | 0101 | $3\Delta\varphi$ |
| 7 | Off | On | On | Off | 0110 | $6\Delta\varphi$ |
| 8 | Off | On | On | On | 0111 | $7\Delta\varphi$ |
| 9 | On | Off | Off | Off | 1000 | $8\Delta\varphi$ |
| 10 | On | Off | Off | On | 1001 | $9\Delta\varphi$ |
| 11 | On | Off | On | Off | 1010 | $10\Delta\varphi$ |
| 12 | On | Off | On | On | 1011 | $11\Delta\varphi$ |
| 13 | On | On | Off | Off | 1100 | $12\Delta\varphi$ |
| 14 | On | On | Off | On | 1101 | $13\Delta\varphi$ |
| 15 | On | On | On | Off | 1110 | $14\Delta\varphi$ |
| 16 | On | On | On | On | 1111 | $15\Delta\varphi$ |

The phase-shifter of FIG. 4 reduces control circuit complexity since each phase-shifter segment requires only a single-bit control signal. A phase-shifter with greater degree of controllability requires a greater number of segments. For instance, 12-bit controllability, requires 12 segments, so that the binary weighting of the segments results in the smallest segment being 4096 ($2^{12}$) times smaller than the largest segment. Producing such a small segment, or producing segments that decrease in size in this manner, can present a challenging fabrication task. This disclosure provides a further embodiment that achieves a beneficial compromise between the physical fabrication and the electronic control of the phase-shifter segments, while preserving a certain level of electronic complexity for calibration and control flexibility.

Figure 5:
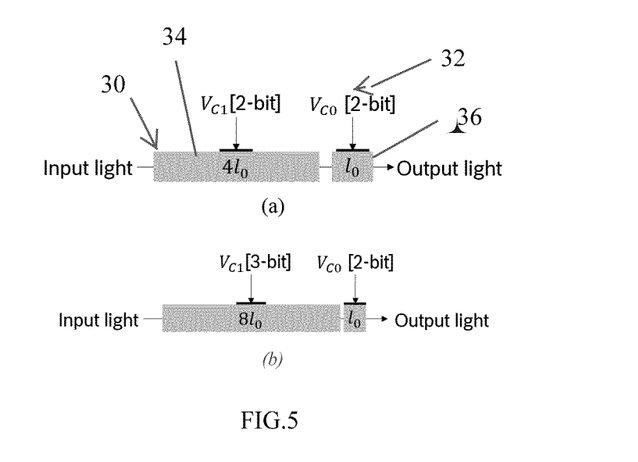
FIG. 5(a) is a diagram of a multi-segment phase-shifter with a 4-bit control according to another aspect of the disclosure.
FIG. 5(b) is a diagram of a multi-segment phase-shifter with a 5-bit control according to another aspect of the disclosure.

In one aspect of this approach, a multi-bit control voltage is implemented, rather than a single-bit on/off mechanism as in the phase-shifter 22. For instance, as shown in FIG. 5(a), a 4-bit phase-shifter 32 for a waveguide 30 is provided that uses a 2-bit control signal $V_{C1}$, $V_{C0}$ combined with a 2-segment 34, 36 binary phase-shifter. The effective number of bits for the controllability can increase by adding more bits to the control signals $V_{C1}$, $V_{C0}$, or by increasing the number segments in the physical implementation. It must be noted that scaling the length of the segments should be according to the number of the bits chosen for the control signal. For a 2-bit control signal shown in FIG. 5(a), the length from one segment to the other is scaled by $2^2=4$, meaning that the longest segment 34 is four times longer (4l) than the smaller segment 36 (l). In one aspect of this embodiment, if the control signal has n bits, then the length of the adjacent segments should scale by 2n. It can be appreciated that the phase shift provided by a given segment depends on the voltage $V_{C1}$ or $V_{C0}$, which can be scaled with 2-bit accuracy. Again, assuming that the minimum phase shift is $\Delta\varphi$ binary activation of the two segments 34, 36 in the example of FIG. 5(a) provides phase shifts according to the following Table 2:

| Step | Seg. 34 | Binary Equiv. | Seg. 36 | Binary Equiv. | Phase shift |
|---|---|---|---|---|---|
| 1 | Off | 00 | Off | 00 | 0 |
| 2 | Off | 00 | ⅓ $V_{C0}$ | 01 | $\Delta\varphi$ |
| 3 | Off | 00 | ⅔ $V_{C0}$ | 10 | $2\Delta\varphi$ |
| 4 | Off | 00 | $V_{C0}$ | 11 | $3\Delta\varphi$ |
| 5 | ⅓ $V_{C2}$ | 01 | Off | 00 | $4\Delta\varphi$ |
| 6 | ⅓ $V_{C2}$ | 01 | ⅓ $V_{C0}$ | 01 | $5\Delta\varphi$ |
| 7 | ⅓ $V_{C2}$ | 01 | ⅔ $V_{C0}$ | 10 | $6\Delta\varphi$ |
| 8 | ⅓ $V_{C2}$ | 01 | $V_{C0}$ | 11 | $7\Delta\varphi$ |
| 9 | ⅔ $V_{C2}$ | 10 | Off | 00 | $8\Delta\varphi$ |
| 10 | ⅔ $V_{C2}$ | 10 | ⅓ $V_{C0}$ | 01 | $9\Delta\varphi$ |
| 11 | ⅔ $V_{C2}$ | 10 | ⅔ $V_{C0}$ | 10 | $10\Delta\varphi$ |
| 12 | ⅔ $V_{C2}$ | 10 | $V_{C0}$ | 11 | $11\Delta\varphi$ |
| 13 | $V_{C2}$ | 11 | Off | 00 | $12\Delta\varphi$ |
| 14 | $V_{C2}$ | 11 | ⅓ $V_{C0}$ | 01 | $13\Delta\varphi$ |
| 15 | $V_{C2}$ | 11 | ⅔ $V_{C0}$ | 10 | $14\Delta\varphi$ |
| 16 | $V_{C2}$ | 11 | $V_{C0}$ | 11 | $15\Delta\varphi$ |

It is further contemplated that the number of bits for the control voltage for each segment can vary between segments. For instance, as shown in FIG. 5(b) a shorter segment can be implemented with a 2-bit control signal $V_{C0}$, and a longer segment can be provided with a 3-bit control signal $V_{C2}$. In one embodiment, in order for the phase-shifter to properly cover its entire tuning range, the smallest phase-shift step induced by a segment should be equal to the full-scale phase-shift that can be induced by the summation of all of the shorter segments. A phase-shift step that is smaller than the summation of all shorter segments can cause redundancy in the transfer characteristic for the phase-shifter. Such a redundancy might be desired to overcome other non-idealities, such as mismatch among the segments. In the case where the phase-shift step is larger than the summation of all of the shorter segments, there may be some gaps in the uniformity of the overall transfer characteristic of the phase-shifter. This effect may be desirable in particular cases.

Furthermore, in certain cases it might be beneficial to implement different segments of the phase-shifter using different physical mechanisms. For instance, the less significant bits (LSBs) of the phase-shift can be implemented using an electro-optic effect and the more significant bits (MSBs) can be implemented using a thermo-optic effect. In this case, instead of scaling the physical length of the segments, their effective full-scale phase-shift is considered with respect to the physical process that they use. For instance, a thermo-optic phase-shifter may have twice as much full-scale phase-shift capability compared to an electro-optic phase-shifter. In that case the implementation in FIG. 5(b) can be altered so that the shorter segment 36 is implemented using electro-optic effect with a length of $l_0$ and the longer segment 34 is implemented using thermo-optic effect with a length of $2l_0$ (which is equivalent to an electro-optic phase-shifter with a length of $4l_0$). Such an implementation can have the same performance as the embodiment shown in FIG. 5(a).

Figure 6:
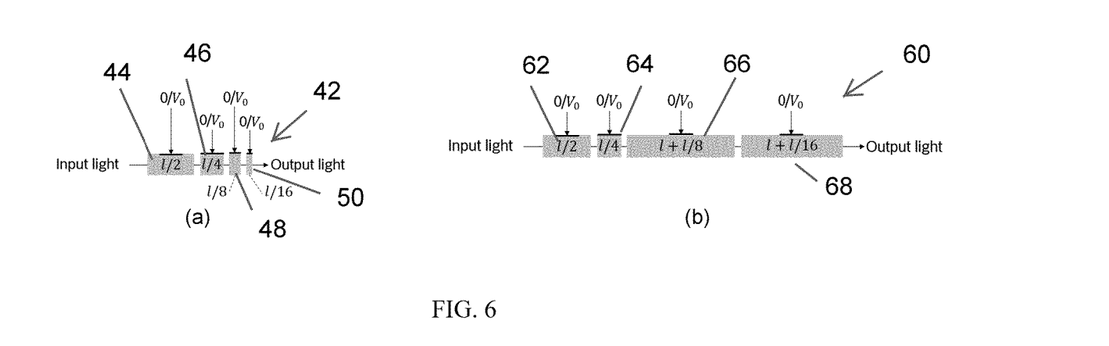
FIGS. 6(a), 6(b) are diagrams of a 4-bit controllable segmented phase-shifter according to yet another feature of the disclosure.

This disclosure contemplates another approach to achieve the desirable compromise discussed above by adding an extra $2\pi$ phase-shift to the smaller segments, to thereby increase their physical length, resulting in greater ease of fabrication. A 4-bit segmented phase-shifter using this technique is shown in FIGS. 6(a)-(b). By way of example, a multi-segment phase-shifter 42 shown in FIG. 6(a) applies the binary weighting approach described above, so that the length of the smallest segment 50 (1/16 l) is ⅛ of the length of the largest segment 44 (½ l), with the two intermediate segments 46, 48 having lengths of ¼l and ⅛l, respectively. Each segment is activated by a binary voltage $V_0$. According to this aspect of the disclosure, the multi-segment phase-shifter of FIG. 6(a) is modified as shown in FIG. 6(b) so that the length of the smallest segment is adjusted so that the fabrication doesn't require implementing any fine features and so that only fabrication tolerances define the smallest feasible phase-shift, while generally preserving the binary weighting between segments. In particular, as seen in FIG. 6(b), a 2π phase-shift is added to the two smaller segments 48, 50 of the phase-shifter 42 (FIG. 6(a)), or more specifically the lengths of what would have been the two smaller segments 66, 68 (⅛l and ¹⁄₁₆l, respectively) are increased by the length l, resulting in the 2π phase-shift. It can be appreciated that a 2π phase shift does not alter the baseline phase shift of the modified segment. In other words, if the smallest segment 50 in FIG. 6(a) produces a phase shift of Δφ, a 2π (i.e., 360°) offset still yields a phase shift of Δφ. This approach relaxes the fabrication feature size by a factor of 4, namely from ¹⁄₁₆l in the example of FIG. 6(a) to ¼l in the modified example of FIG. 6(b). The same 1-bit control voltage $V_0$ can be applied to the segments Binary segmentation of the phase-shifter as disclosed herein is beneficial in reducing the number of control signals and the electrical connections to that phase-shifter array. However, from a fabrication standpoint, certain non-uniformities of the fabrication process close to the edges of the segments can compromise the ability to scale proportionally to the length of the segments. The farther the segment effective lengths stray from the binary weighting contemplated by the disclosure, the greater the potential non-linearity in the transfer characteristic of the phase-shifter. The multi-segment phase-shifter 70 shown in FIG. 7 addresses this concern over fabrication imperfections by implementing a unary (thermometer) code segmentation pattern in which the segments are of similar length $l_0$. The number of segments for unary coding increases exponentially in relation to the number of bits required from the segmentation. Consequently, the unary segmentation approach of the disclosure can be particularly useful where the number of bits expected from segmentation is small, or when the system is implemented in a monolithic electronic-photonic process where the control signals can be generated and routed more flexibility compared to the heterogeneous implementation with electronic and photonic parts on separate chips.

The control voltages $V_{CTRL(1-4)}$ connected to each segment (in the example of FIG. 7) can still have multi-bit resolution when using unary segmentation. Furthermore, multiple segments can be grouped together to be controlled using the same signal, such as groups in which the number of segments is scaled similar to the lengths of the binary implementation illustrated in FIG. 5(a). Grouping multiple segments makes the unary implementation very similar to the binary implementation. However, with this modification to the unary segmentation approach, all of the binary sections are composed of similarly sized unit segments so that the fabrication non-uniformity effects at the edges of the segments will not cause any non-linearity in the transfer characteristic of the digital to phase-shift converter. In addition, with this approach, techniques used in electronic digital-to-analog converters (DACs), such as dynamic element matching, can be implemented in the modified unary segmented phase-shifter to improve the performance of the phase-shifter. For instance, the unit elements used in each binary section can be rotated periodically or randomly to reduce mismatch between the different sections.

Another implementation aspect that can relax any potential fabrication difficulties is to use metal patterning to control the phase-shifter in a segmented fashion, rather than patterning the phase-shifter itself. For example, when using an electro-optic phase-shifter, the phase-shift segments are pn-junctions that are doped along the waveguide. Thus, the implementation of each segment requires doping the silicon waveguide along the length of that segment and ideally across the cross-section of the whole waveguide. The semiconductor waveguide in one embodiment will then include p- and n-doped segments corresponding to the phase-shifter segments, separated by non-doped segments.

Figure 8:
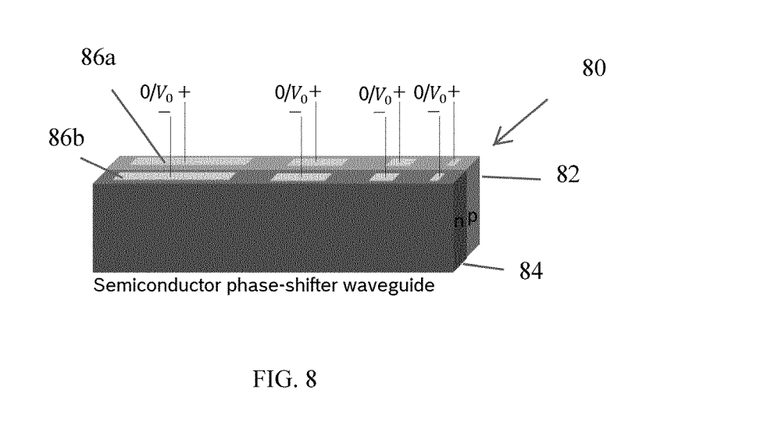
FIG. 8 is a depiction of a multi-bit, multi-segment phase-shifter according to one embodiment of the disclosure.

For a high-resolution phase-shifter it can become challenging to dope segments of a waveguide with deep sub-micrometer length and in a cross section in the order of one square micrometer. An alternative is to use a continuous pn-junction and only pattern the control electrodes or electrical contacts, as depicted in FIG. 8. The phase-shifter 80 in FIG. 8 is formed by a p-doped semiconductor layer 82 and an n-doped layer 84. As shown in FIG. 8, the pn-junction is continuous, but the electrodes, such as electrodes 86a, 86b for the first segment, are of limited length corresponding to the desired length of the corresponding segment. For a phase-shifter such as the phase-shifter 22 in FIG. 4, the contacts 86a, 86b for the longest segment (segment 24) can have a length l. The remaining contacts are similarly sized (i.e., ½ l, ¼ l, ⅛ l). This fabrication approach allows local adjustment of the carrier density in the pn-junction to ultimately induce a precise phase-shift on the light path.

The multi-segment n-bit controllable phase-shifters disclosed herein are not limited to a particular phase-shift mechanism. Thus, the embodiments disclosed herein can be implemented with thermo-optic, electro-optic or any other physical mechanisms that controls the optical path length or refractive index of a material. It is further contemplated that the physical implementation of a single phase-shifter does not have to be on a straight line, as depicted in the present figures, but can adopt other configurations. For instance, the segments can be folded in a physical layout to optimize the area that they might occupy on a photonic chip.

This disclosure contemplates a phase-shifter that is segmented into multiple segments calibrated to the overall length of the conventional single phase-shifter. Each segment receives a control signal, which can be a single or multi-bit signal, with the phase-shift capability of the segmented phase-shifter controlled by which segment receives a control signal. In one implementation, a binary weighting is applied to determine segment lengths. In another implementation, smaller segments can be increased in length to achieve a 2π offset while maintaining the same binary relationship among segments. In a further aspect of the disclosure, multiple segments of uniform lengths can be used for a single phase-shifter with each segment controlled by an n-bit signal. In each embodiment, beam steering circuitry, such as circuitry B in FIGS. 1-2, control the control signal applied to the phase-shifter segments to thereby control the amount of phase shift induced in the associated waveguide. The control signal can be a single bit signal, such as a zero voltage or a fixed voltage $V_0$, such as the examples in FIGS. 3, 4 and 6. In those embodiments, the phase-shifter segments impart a predetermined phase shift when activated by the beam steering circuitry, with the composite phase shift determined by which of the segments is activated. The lengths of the segments can be adjusted to achieve a binary sequence that emulates prior phase-shifters that use a digital code fed through a digital-to-analog converter (DAC) to determine a voltage applied to the phase-shifter.

Figure 7:
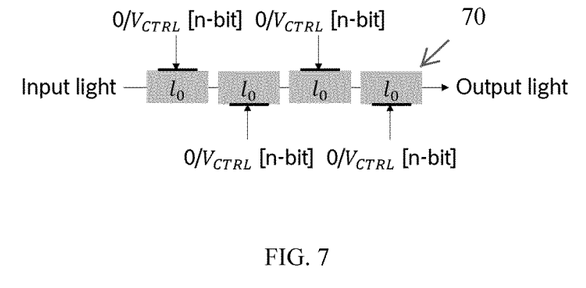
FIG. 7 is a diagram of an (n+2) bit controllable multi-segment phase-shifter according to one aspect of the disclosure.

Alternatively, the control circuitry B can be configured to apply an n-bit voltage to the phase-shifter segments, such as in the embodiments of FIGS. 5(a), 5(b) and 7. Although these embodiments still require a DAC to direct application of the n-bit voltage, the segmentation of the phase-shifter means that a much greater number of phase shifts can be accomplished than can be achieved with a conventional single phase-shifter under the same n-bit control. In the example of FIG. 5(a), the two segments, having a combined length l, each controlled by a 2-bit voltage, produce 15 phase shift magnitudes (see Table 2), whereas a single phase-shifter, having the length l, under 2-bit control is only capable of three phase shift magnitudes.

The present disclosure should be considered as illustrative and not restrictive in character. It is understood that only certain embodiments have been presented and that all changes, modifications and further applications that come within the spirit of the disclosure are desired to be protected.

What is claimed is:

1. An optical element for transmitting a light beam comprising:
a waveguide configured to transmit the light beam from an input end to an output end, said waveguide having an optical property that can be selectively modified; and
a phase-shifter incorporated into said waveguide, said phase shifter operable to modify an optical property of said waveguide in response to a control signal to induce a phase shift in the light beam propagated therethrough, wherein said phase shifter includes two or more adjacent segments, each segment configured to induce a phase shift in response to said control signal that is separate from a phase shift induced by any other segment,
wherein said phase-shifter is operable to modify the optical property of said waveguide in response to an electrical voltage as said control signal,
wherein said two or more segments have different lengths relative to one another,
wherein said control signal includes a separate control signal for each of said two or more segments of said phase-shifter,
wherein each of said separate control signals is an n-bit voltage signal, where n is two (2) or more, and
wherein the number of bits of the n-bit voltage signal is different between two or more of said two or more segments of said phase-shifter, with the number of bits determined in relation to a length of each of said two or more segments.

2. The optical element of claim 1, wherein each segment is configured to induce a different phase shift relative to any other segment in response to said control signal.

3. The optical element of claim 1, wherein a shortest one of said two or more segments produces a phase shift of $\Delta\varphi$ and the lengths of the other segments are increased in relation to the length of the shortest one of the segments to produce phase shifts that are multiples of $\Delta\varphi$.

4. The optical element of claim 3, wherein the phase shift of each segment is given by the relationship $2^{N-n}\Delta\varphi$, where N is the total number of segments and n is the number of a particular segment.

5. The optical element of claim 4, wherein the length of each segment is given by the relationship l/n, where n is the number of the particular segment and l is a predetermined length.

6. The optical element of claim 1, wherein the combined length of all of said two or more segments equals a length corresponding to a pre-determined maximum phase shift applied to said waveguide.

7. The optical element of claim 1, wherein:
the length of each segment is given by the relationship l/n, where n is the number of the particular segment and l is a predetermined length; and
the length of at least the shortest segment l/N, where N is the total number of segments of said phase-shifter, is increased by l to produce a $2\pi$ offset to the phase shift induced by the segment.

8. The optical element of claim 1, wherein:
said waveguide is defined by a p-doped semiconductor layer and an adjacent n-doped semiconductor layer; and
said phase-shifter is defined at a pn-junction between said layers.

9. The optical element of claim 8, wherein said phase-shifter includes electrical contacts at said pn-junction corresponding to each of said two or more adjacent segments, each of said electrical contacts connectable to receive said control signal from a controller.

10. The optical element of claim 9, wherein said p-doped and n-doped layers of said waveguides are continuous and the electrical contacts for each of said segments have a length that is different between two or more of said two or more segments.

11. The optical element of claim 10, wherein the segment having the shortest electrical contacts produces a phase shift of $\Delta\varphi$ and the lengths of the electrical contacts of the other segments are increased in relation to the length of the shortest electrical contacts to produce phase shifts that are multiples of $\Delta\varphi$.

12. The optical element of claim 1, further comprising a plurality of waveguides, each of said plurality of waveguides including a phase-shifter incorporated therein that is operable to modify an optical property of the corresponding waveguide in response to a control signal to induce a phase shift in a light beam propagated therethrough, wherein said phase shifter of at least a number of said plurality of waveguides includes two or more adjacent segments, each segment configured to induce a phase shift in response to said control signal that is separate from a phase shift induced by any other segment.

13. The optical element of claim 1, wherein:
the optical property is a refractive index;
the waveguide is formed of a material in which the refractive index can be modified; and
the phase-shifter incorporated into said waveguide extends over a length of said waveguide in which the refractive index is modified.

14. An optical element for transmitting a light beam comprising:
a waveguide configured to propagate the light beam from an input end to an output end, said waveguide having an optical property that can be selectively modified;
a phase-shifter incorporated into said waveguide, said phase shifter operable to modify an optical property of said waveguide in response to a control signal to induce a phase shift in the light beam propagated therethrough, wherein said phase shifter includes two or more adjacent segments, each segment configured to induce a phase shift in response to said control signal that is separate from a phase shift induced by any other segment; and
a controller operable to provide a separate control signal to each of said two or more segments, and is further operable to provide said separate control signals in any combination of said two or more adjacent segments to induce a phase shift in said waveguide that is a combination of the phase shift induced by each segment, wherein said two or more segments each have different lengths relative to one another, wherein each of said separate control signals is an n-bit voltage signal, where n is two (2) or more, and wherein the number of bits of the n-bit signal for at least two of said two or more adjacent segments is different, with the number of bits determined in relation to a length of each of said two or more segments.

15. The optical element of claim 14, further comprising:
a plurality of waveguides, each of said plurality of waveguides including a phase-shifter incorporated therein that is operable to modify an optical property of the corresponding waveguide in response to a control signal to induce a phase shift in a light beam propagated therethrough, wherein said phase shifter of at least a number of said plurality of waveguides includes two or more adjacent segments, each segment configured to induce a phase shift in response to said control signal that is separate from a phase shift induced by any other segment; and optics at an output end of said plurality of waveguides configured to receive and combine the light beams propagated through each of said plurality of waveguides into a single transmitted light beam.

16. The optical element of claim 15, wherein said controller is configured to provide said control signal to any combination of phase-shifter segments in any combination of waveguides to steer the transmitted light beam.

17. The optical element of claim 15, wherein for each phase-shifter including two or more adjacent segments, each segment has a different length and is configured to produce a different phase shift relative to any other segment in response to a respective one of the separate control signals.

* * * * *